US006938260B1

(12) United States Patent
Wason

(10) Patent No.: US 6,938,260 B1
(45) Date of Patent: Aug. 30, 2005

(54) COMPLEX DATA NAVIGATION, MANIPULATION AND PRESENTATION SUPPORT FOR VISUALAGE JAVA

(75) Inventor: James Richard Wason, Tuxedo, NY (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 09/615,976

(22) Filed: Jul. 14, 2000

(51) Int. Cl.[7] .......................... G06F 3/00; G06F 9/44; G06F 9/46; G06F 13/00

(52) U.S. Cl. ....................... 719/316; 717/105; 717/120

(58) Field of Search ............................ 707/100–104.1, 707/1–10; 709/313–318; 717/100–123; 345/700–862; 715/501.1–510; 719/316

(56) References Cited

U.S. PATENT DOCUMENTS 5,694,608 A * 12/1997 Shostak ...................... 715/506
5,832,268 A * 11/1998 Anderson et al. ........... 709/316
6,263,339 B1 * 7/2001 Hirsch ........................ 707/102
6,279,008 B1 * 8/2001 Tung Ng et al. ........... 707/102
6,301,579 B1 * 10/2001 Becker ....................... 707/102

* cited by examiner

*Primary Examiner*—Meng-Al T. An
*Assistant Examiner*—Diem K. Cao
(74) *Attorney, Agent, or Firm*—Scully, Scott, Murphy & Presser; William E. Schiesser

(57) ABSTRACT

An object oriented computing system in an object oriented computing platform environment. The computing system comprises a computing platform, and a plurality of objects residing on said computing platform. Each of these objects includes an object frame containing data attributes and at least one object method which performs actions on the associated object. The objects are arranged in an inheritance hierarchy of objects to define parent and child objects, such that child objects inherit the data attributes and methods of parent objects, and to further define objects in the inheritance hierarchy which are unrelated as parent and child objects, such that unrelated objects do not inherit the data attributes and method of each other. Visual support means are provided to display visually predefined aspects of the objects and complex objects.

18 Claims, 7 Drawing Sheets

1. Visual support to define a simple object which participates in a complex object.

2. Virtual definition of complex object structures.

3. Visual support for contextual information.

4. Generic support for cascade of complex object actions.

5. Visual support for presentation and manipulation of normalized data.

6. Visual support for computed fields.

7. Visual support for summary fields.

Figure 2

COMPLEX DATA NAVIGATION, MANIPULATION AND PRESENTATION SUPPORT FOR VISUALAGE JAVA

CROSS REFERENCE TO COPENDING APPLICATIONS

The disclosure of this application is related to the disclosures of the following copending applications:

"Business Logic Support" Ser. No. 09/616,800, filed Jul. 14, 2000 (Attorney Docket END9-2000-0079); "Text File Interface Support In An Object Oriented Application," Ser. No. 09/616,809, filed Jul. 14, 2000 (Attorney Docket END2000-0080); "Flexible Help Support In An Object Oriented Application," Ser. No. 09/616,808, filed Jul. 14, 2000 (Attorney Docket END9-2000-081); and "Dynamic Java Beans For VisualAge For Java," Ser. No. 09/615,973, filed, Jul. 14, 2000 (Attorney Docket END9-2000-082); the disclosures of the four above-identified copending applications are hereby incorporated herein by reference in their entireties.

BACKGROUND OF THE INVENTION

This invention generally relates to data processing systems and methods, and more specifically, to object oriented computing environments.

Object oriented programming systems and processes, also referred to as "object oriented computing environments", have been the subject of much investigation and interest in state of the art data processing environments. As is well known to those having skill in the art, object oriented programming systems are composed of a large number of "objects". An object is a data structure, also referred to as a "frame", and a set of operations or functions, also referred to as "methods", that can access that data structure. The frame has many "slots", each of which contains an "attribute" of the data in the slot. The attribute may be a primitive (such as an integer or string) or an object reference which is a pointer to another object. Objects having identical data structures and common behavior can be grouped together into, and collectively identified as, a "class".

Each defined class of objects will usually be manifested in a number of "instances". Each instance contains the particular data structure for a particular example of the object. In an object oriented computing environment, the data is processed by requesting an object to perform one of its methods by sending the object a "message". The receiving object responds to the message by choosing the method that implements the message name, executing this method on the name instance, and returning control to the calling high level routine along with the results of the method. The relationships between classes, objects and instances are established during "build time" or generation of the object oriented computing environment, i.e. prior to "run time" or execution of the object oriented computing environment.

As described above, object oriented programming systems are composed of a large number of objects. The amount of data and processing accommodated by an object is typically small enough to be contained within a single row of a database table or a single data entry panel. However, it will be recognized by those having skill in the art that a user view of an object may be considerably more complicated. Thus, simple objects may be tightly bound together as a Complex Object because they all participate in a business process. Alternatively, simple objects may be tightly bound as a Complex Object for purposes of data navigation and presentation or because of cross-object data verifications.

Additional background information about complex objects in an object oriented computing environment is given in U.S. Pat. No. 5,832,268, the disclosure of which is hereby incorporated herein by reference.

An important problem (see FIG. 3) solved by EADP complex object support is the scattering of relational data due to normalization. Traditionally a lot of application logic is devoted to reassembling this data for presentation, and also to providing navigation paths to drill down through the data. Much of this logic is very similar from one application to another. EADP provides runtime support for many of these common application tasks (complex object navigation, presentation of normalized data through quick views, calculation of computed fields, calculations of summary fields, and context control through the ruler list). EADP also provides build time support so that an application can be adapted to use these features using custom editors for Java beans.

SUMMARY OF THE INVENTION

An object of the present invention is to provide a system and method for supporting complex objects in an object oriented computing environment.

Another object of this invention is to provide a method and system for supporting complex objects in an object oriented computing environment to thereby reduce the amount of customized programming which must be generated.

These and other objects are accomplished, according to the present invention, in an object oriented computing system in an object oriented computing platform environment. The computing system comprises a computing platform, and a plurality of objects residing on said computing platform. Each of these objects includes an object frame containing data attributes and at least one object method which performs actions on the associated object. The objects are arranged in an inheritance hierarchy of objects to define parent and child objects, such that child objects inherit the data attributes and methods of parent objects, and to further define objects in the inheritance hierarchy which are unrelated as parent and child objects, such that unrelated objects do not inherit the data attributes and method of each other.

The computing system further comprises an object manager which sends messages to the objects to perform actions on the associated object frame using the associated object messages; and means, executing on said computing platform and responsive to a user request, for grouping selected ones of said objects in said inheritance hierarchy which are unrelated to each other as parent and child objects, into a plurality of Complex Objects. Visual support means is provided to display visually predefined aspects of the objects and complex objects. For example, the visual support means may be used to define a simple object which participates in a complex object, or for presentation and manipulation of normalized data. The visual support means may also be used for computed fields, or for summary fields.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 shows principal features of the preferred embodiment of this invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Prior to describing a system and method for supporting Complex Objects according to the invention, a general overview of object oriented computing environments will be provided. An overview of a system and method for supporting Complex Objects will then be provided, followed by a detailed design description.

Object Oriented Computing Environment

In an object oriented computing environment, work is accomplished by sending action request messages to an object which contains data. The object will perform a requested action on the data according to its predefined methods. Objects may be grouped into object classes which define the types and meanings of the data, and the action requests (messages) that the object will honor. The individual objects containing data are called instances of the class.

Object classes can be defined to be subclasses of other classes. Subclasses inherit all of the data characteristics and methods of the parent class. They can add additional data and methods and they can override or redefine any data elements or methods of the parent class. An object may be represented schematically, and is represented herein, by a rectangle including an upper rectangle and a lower rectangle within the object rectangle. The upper rectangle contains the data structure represented by a frame having slots, each of which contains an attribute of the data in the slot. The lower rectangle indicates the object's methods which encapsulate the frame and which are used to perform actions on the data encapsulated in the frame of the upper rectangle.

Figure 1:
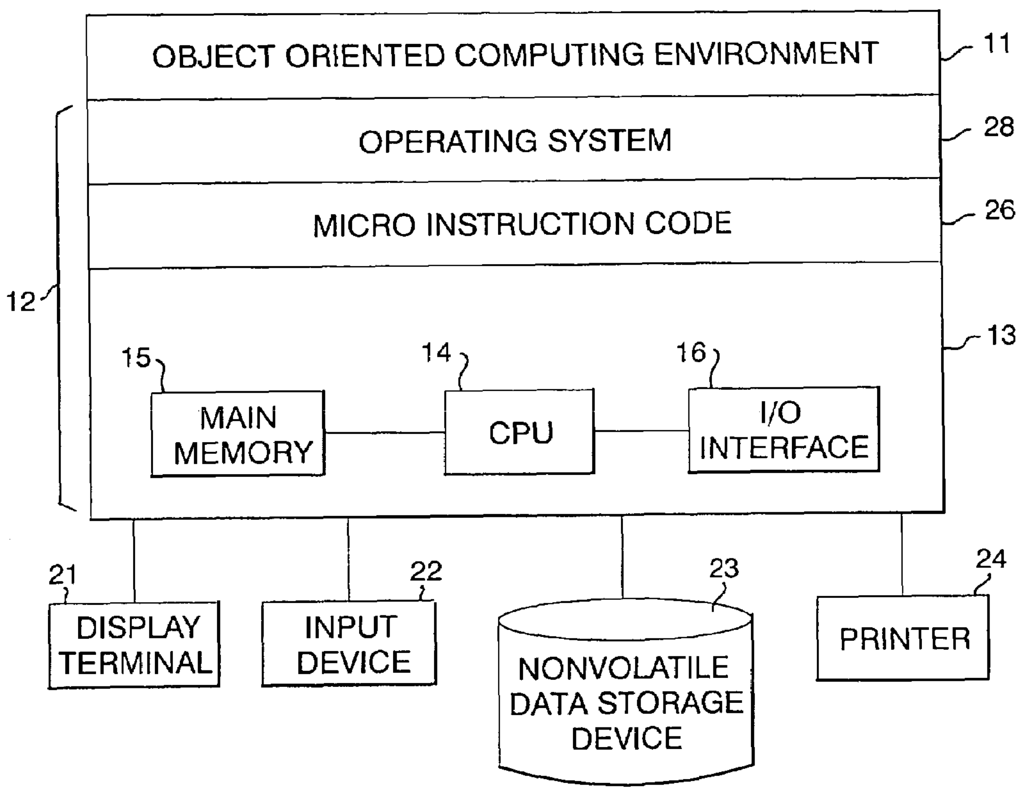
FIG. 1 schematically illustrates a hardware and software environment in which the present invention may operate.
Figure 3:
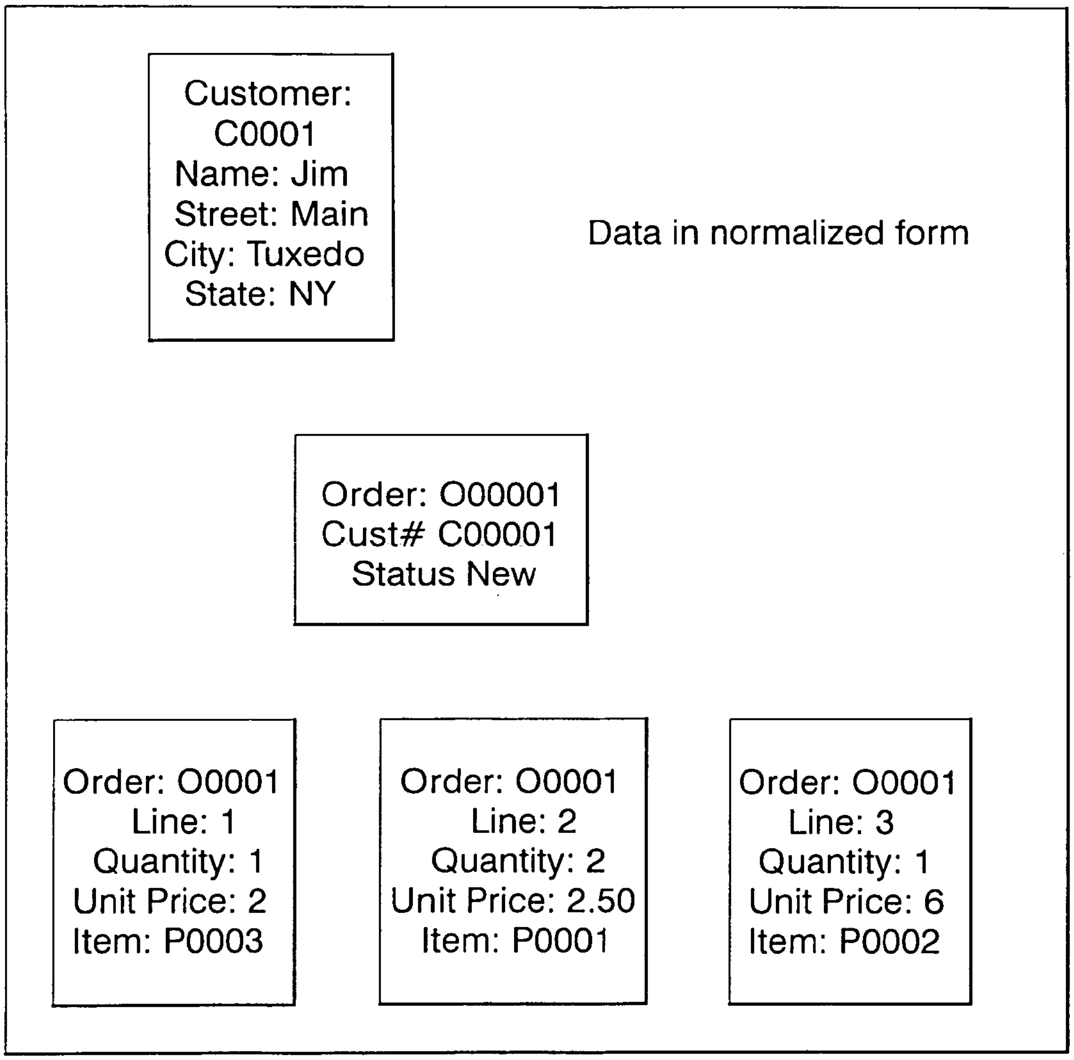
FIG. 3 illustrates the scattering of relational data due to normalization.

Referring now to FIG. 1, a hardware and software environment in which the present invention operates will now be described. As shown in FIG. 1, the present invention is a method and system for supporting Complex Objects within an object oriented computing environment 11 operating on one or more computer platforms 12. Object oriented computing environment 11 includes an object manager, the components of which are illustrated in FIG. 2. It will be understood by those having skill in the art that computer platform 12 typically includes computer hardware units 13 such as a central processing unit (CPU) 14, a main memory 15 and an input/output (I/O) interface 16, and may include peripheral components such as a display terminal 21, an input device 22 such as a keyboard or a mouse, nonvolatile data storage devices 23 such as magnetic or optical disks, printers 24 and other peripheral devices. Computer platform 12 also typically includes microinstruction codes 26 and an operating system 28.

As shown in FIG. 1, object oriented computing environment 11 operates on computer platform 12. For example, each computer platform 12 may be a computer having an IBM System 370 architecture. However, it will be understood by those having skill in the art that object oriented computing environment 11 may operate across multiple computer platforms. Operating system 28 may be Window NT or UNIX. Object oriented computing environment 11 is preferably written in Java. The design and operation of computer platforms and object oriented computing environments including that of an object manager, are well known to those having skill in the art.

As indicated in FIG. 2, the present invention relates to the following important features:

1. Visual support to define a simple object which participates in a complex object;
2. Virtual definition of complex object structures;
3. Visual support for contextual information;
4. Generic support for cascade of complex object actions;
5. Visual support for presentation and manipulation of normalized data;
6. Visual support for computed fields; and
7. Visual support for summary fields.

Visual Support to Define a Simple Object which Participates in a Complex Object Complex Object support is provided by inheriting from the EADPApplicationClass. This class enforces standardization of complex object handling, and provides support for complex object actions. Each child of the EADPApplicationClass controls a single table in a single database. The database support classes make use of VisualAge Persistence Builder, and are generated using that facility. A new child (to handle a new database table) is created visually using the facilities of the VisualAge Workbench. It is linked by naming convention to the PersistenceBuilder classes (a special child of VapEntityBeanImpl, the EADPEntityBeanImpl, is specified as the base class for the generated Persistence Builder classes. This provides the linkage back into EADP from PersistenceBuilder).

Much of the complex object definition is achieved by defining ruler to subobject relationships within PersistenceBuilder. These use strict naming conventions so that the classes generated by PersistenceBuilder can be correctly interpreted by EADP.

An important feature of this invention is the ability to customize each child visually using bean properties (customized using property sheets in the Visual Composition Editor), instead of requiring that methods from the parent class be redefined. The first step is to create a child of EADPDatabaseDefinition class (the class needs to be redefined once for each database). In the visual editor for the child class, two beans are added, one of type EADPVapConnection, and the other of type EADPDirectoryClass. The "this" feature of each bean is attached to the vapConnection and currentDirectory properties respectively of the definition class.

Opening property sheets on the two beans allows customization of the application as a whole. The vapConnection is customized to point to the singleton for the PersistenceBuilder generated datastore. This binds the EADP code to the PersistenceBuilder service classes. The complex object definition which was defined using PersistenceBuilder can be reviewed using the custom editor for the "complexObjectStructure" property of the directory. The custom editor opened here shows the existing complex object structure and the name of the application class at each point. The name of the application class is specified here; however the application class must be created as a child of EADPApplicationClass. When the new class is first created (from within the VisualAge Workbench) the Composition Editor is opened. A bean of type EADPDAManager is user added (the name of the bean does not matter), and its "this" attribute is attached to the currentDatamanager property of the application class. Customization is now achieved by opening the property sheet for the bean and using the custom editors defined for each of its properties. The first and most important customization is to attach the class to its application definition class by setting the definition class property. Once this is done, the application class picks up its table name, database name, and key columns from values that were entered when it was defined in PersistenceBuilder.

Figure 4:
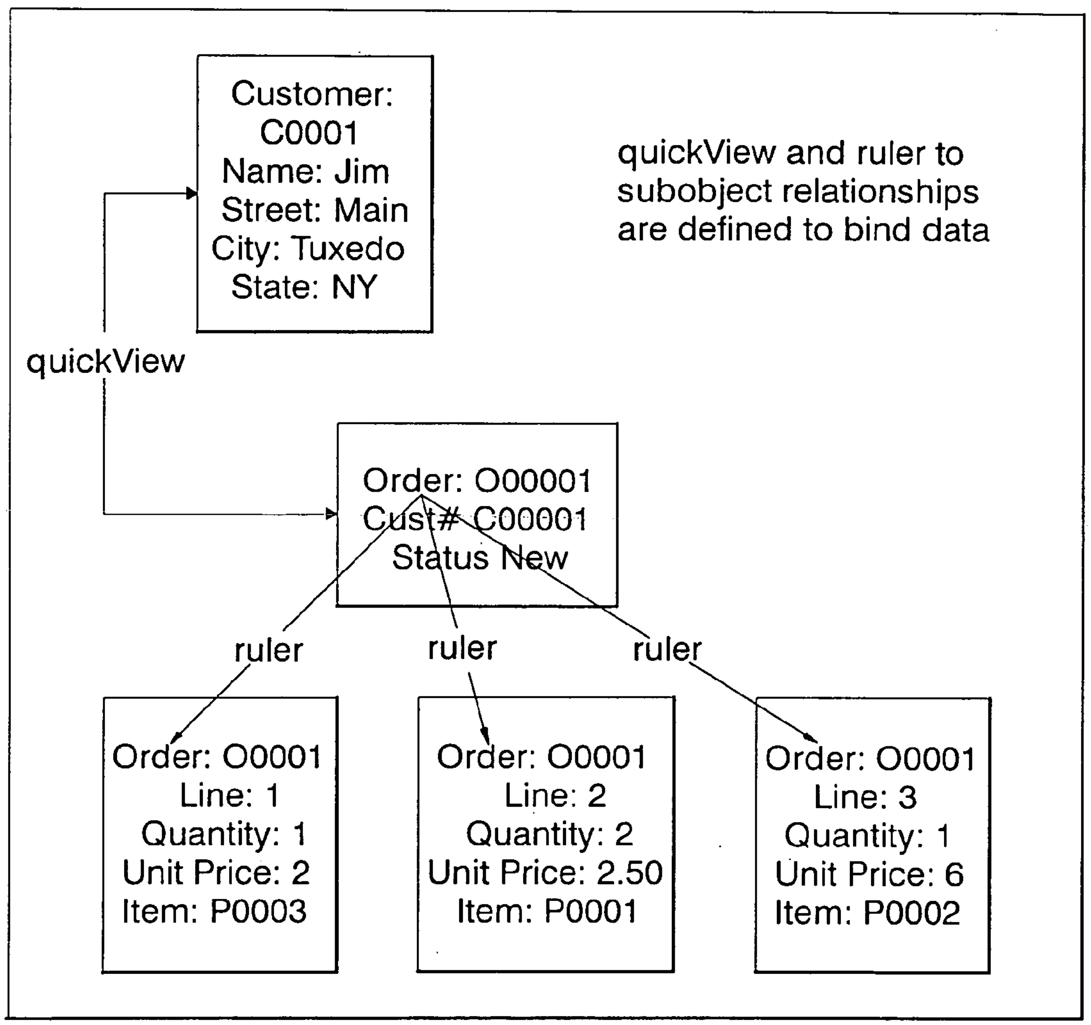
FIG. 4 illustrates visual definition of complex object structures.

Visual Definition of Complex Object Structures (See FIG. 4)

The ruler to subobject relationships that glue together a complex object structure are defined within PersistenceBuilder. EADP is then able to use the generated PersistenceBuilder code to provide a base for full complex object support.

Visual Support for Contextual Information

Contextual information is the data in the rows for all the rulers that were used to select a particular list of subobjects. This invention provides automatically for an ordered collection of the ruler rows to be maintained. In addition, a new class EADPFocalDataRow is provided for visual support of presentation of the context data using the facilities of the VisualAge Visual Composition Editor. This attribute can be attached to a focal data visual bean which allows customization of which attributes to display (or hide). The focal data row is defined as a bean property (focalData) of EADPDAManager.

The context may determine if the data being manipulated can be viewed or updated. Deferred methods are provided to check the context information. The calls to these methods are already provided at appropriate places within display and update methods, so that context checking is integrated into standard processing.

Generic Support for Cascade of Complex Object Actions

When certain actions are performed on a object which is a ruler, they must also be performed on each of its associated subobjects. If any of the subobjects is itself a ruler, the same action must be "cascaded" down through the direct complex object structure. This invention provides specific support for two complex object actions (copy and delete). It also provides generic support to enable additional application specific cascaded complex object actions using the same mechanisms.

Figure 5:
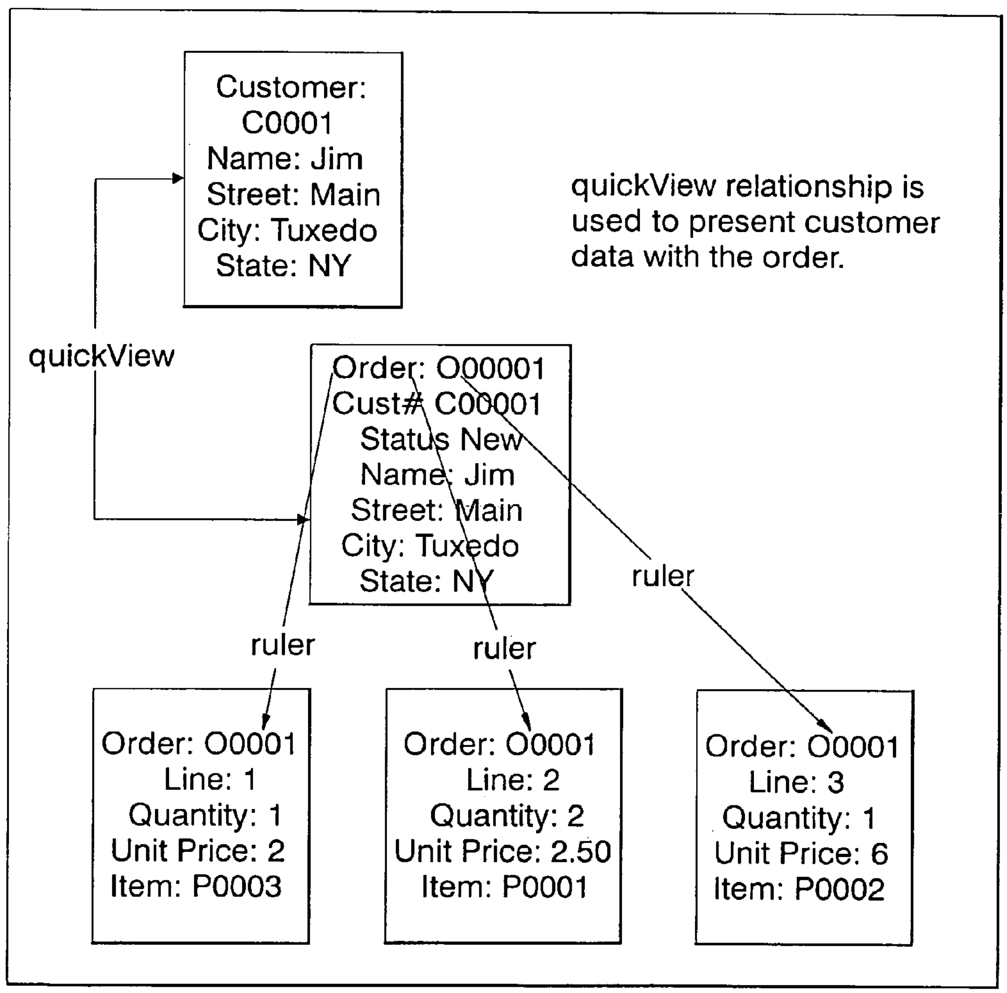
FIG. 5 illustrates visual support for presentation and manipulation of normalized data.

Visual Support for Presentation and Manipulation of Normalized Data (See FIG. 5)

Normalization of data means that one data field (a foreign key) is placed in one table of a database as a link to other data in another table (which is identified by that key field). For example, the CUSTOMER_NUMBER in the ORDERS table is a foreign key which points to more data about the customer (name, address, etc.) that make up the columns of the CUSTOMER table.

This invention allows the designer to use visual programming techniques to add additional virtual columns to the query result rows for one database table (the source table) from another table (the target table) that is linked to it by a foreign key.

An important feature of the invention is the presentation of this customization capability in a way that is easy to understand and use. The mapping is done as a customization of the quickviews property of the data manager class (which is included as a bean in the child of EADPApplicationClass that has been defined for the source table).

A "quick view" relationship between the source and target tables is defined using PersistenceBuilder. The custom editor for the Quick View customization provides a list of all the database tables that have been defined in that manner. The designer can select which columns of the target table are to be included in the source table as quick view columns.

Once added, the quick view columns behave in the application as if they were physical columns of the source table. The quick view columns can be selected as columns to display on entry panels, list panels, or in focal data. They can also be accessed by internal methods as entries in the row dictionary. They are also available as focal data fields.

The EADP text fields (container and entry fields) provide end user (runtime) support for quick view data. To use this facility, the end user must bring up the popup menu in the source text field for any of the fields added as quick views. The popup menu includes two selections which act on quick views: Prompt and QuickOpen. Prompt will bring up a list panel of the target table, with a special button set that allows the end user to select one row of that table. The data from that row will replace the data for the source column and any of its related quick view columns. The QuickOpen selection opens an entry panel for the target table (for the row that matches the key data in the source column). This allows additional fields in the target table which were not included as quick view columns to be viewed (and updated if necessary).

Figure 6:
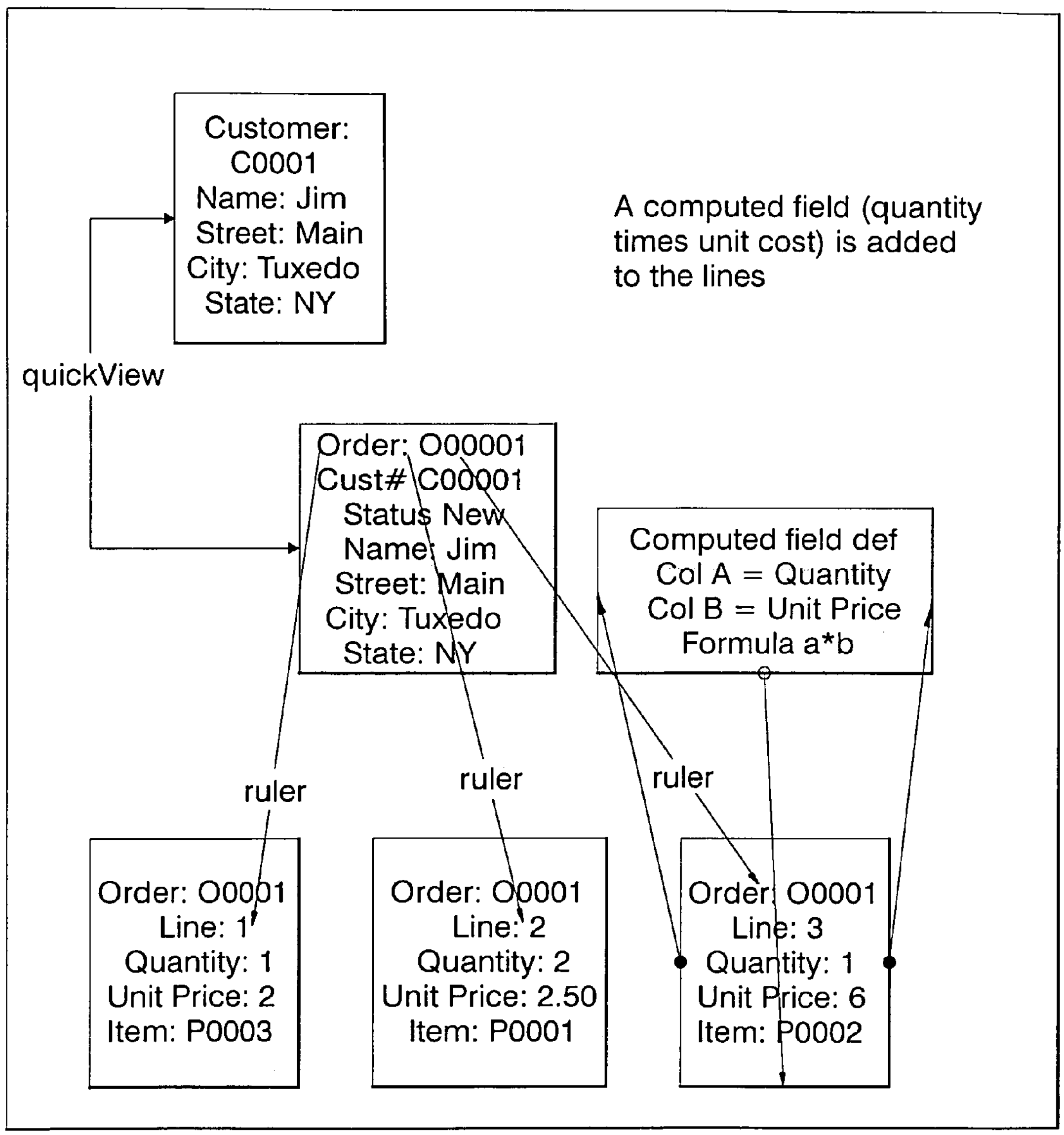
FIG. 6 illustrates visual support for computed fields.

Visual Support for Computed Fields (See FIG. 6)

An example of a computed field is total price of a line item (equal to the unit price times the quantity). This invention provides facilities to allow the designer to add and control computed fields.

The custom editor for the computedColumns property of the EADPDAManager provides facilities to add computed fields as columns using visual programming techniques. This support allows the designer to visually select which columns will participate in the calculation, and to specify the formula for the calculation. Up to four existing columns can be used to define the formula for the computed column. These four fields can be manipulated using any valid expression involving multiplication, addition, division, and subtraction provide the value of the computed field. As with quick view columns, computed columns act as if they are physical columns of the table once they have been defined.

Any existing computed fields are presented using the same techniques. Selecting a computed field will display its associated columns and the formula used to derive that field.

The formula is stored as a network of computation nodes that dynamically provide evaluation. The initialization string is just the formula in human readable terms, The code that initializes the computation nodes is able to parse the formula and set up the correct node structure. Key to this is the ability to adjust to parentheses within the expression so that the order of computation is correct. A more detailed description of this algorithm is given in Appendix B.

Figure 7:
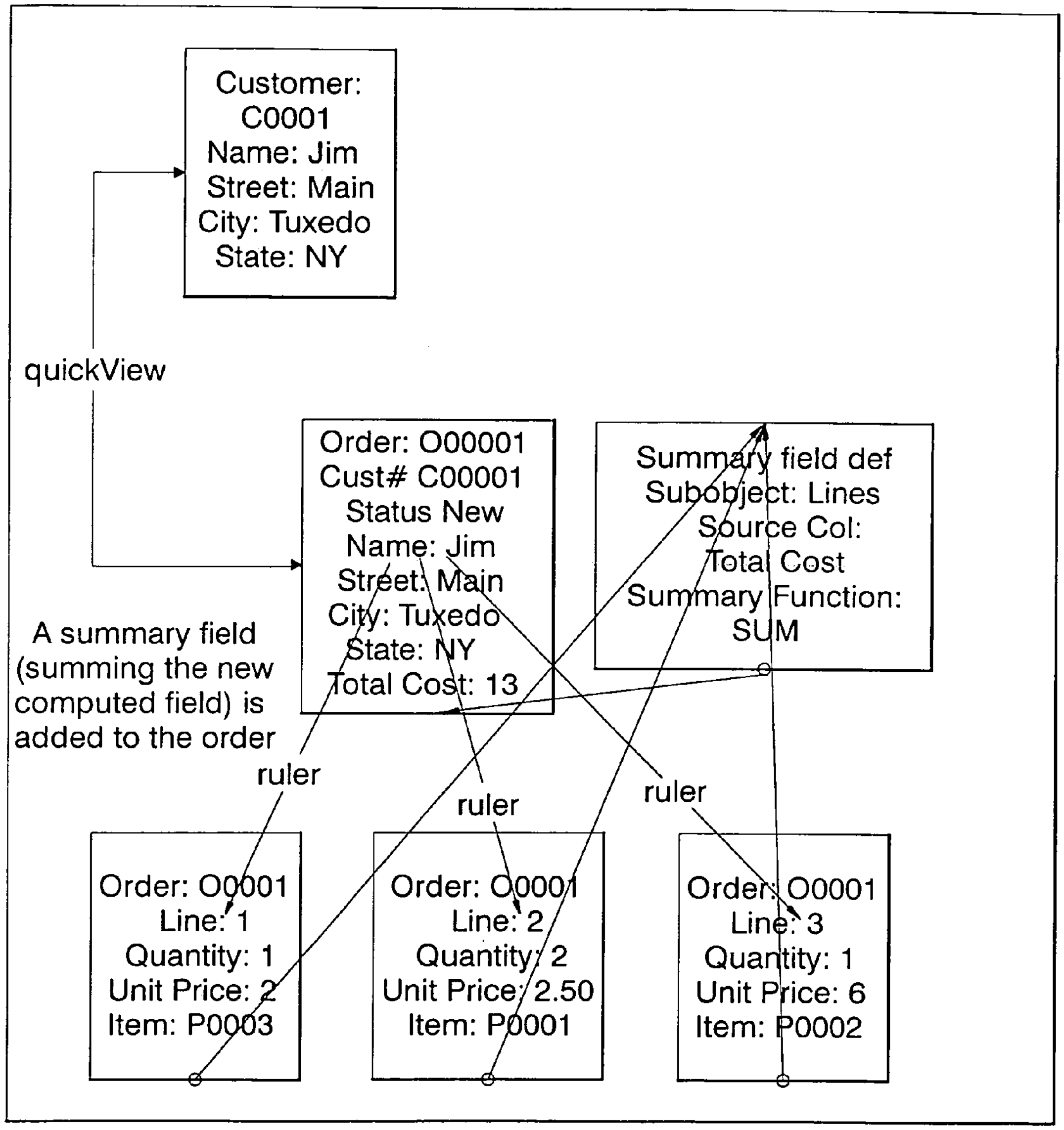
FIG. 7 illustrates visual support for summary fields.

Visual Support for Summary Fields (See FIG. 7)

A summary field is based on the values of a field defined in a subobject. This invention provides visual support to define and present summary fields in a way that makes them easy to understand and control.

The custom editor for the summaryColumns property of the EADPDAManager presents a list of subobjects that have been defined for the current class; the designer can then select the subobject class, the column of the table (which includes quick view, computed and summary fields), and the type of summary function to be used (these include sum, average, maximum, minimum, first, last, count, etc.). As with the other added columns, the summary field acts just like a physical column once it has been defined.

The present invention has been implemented in the Enterprise Application Development Platform (EADP). The user manual for this facility is included herein a Appendix A.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. An object oriented computing system in an object oriented computing platform environment comprising:

a computing platform;

a plurality of objects residing on said computing platform, each of said objects including an object frame containing data attributes and at least one object method which performs actions on the associated object, said objects being arranged in an inheritance hierarchy of objects to define parent and child objects such that child objects inherit the data attributes and methods of parent objects and to further define objects in said inheritance hierarchy which are unrelated as parent and child objects such that unrelated objects do not inherit the data attributes and method of each other;

an object manager which sends messages to said objects to perform actions on the associated object frame using the associated object messages;

means, executing on said computing platform and responsive to a user request, for grouping selected ones of said objects in said inheritance hierarchy which are unrelated to each other as parent and child objects, into a plurality of Complex Objects; and a visual support means to display visually predefined aspects of the attributes and relationships of the objects and complex objects to allow programmatic support for data navigation, presentation and manipulation, the visual support means including a quick view means for selecting columns from one table to be included as columns in a second, viewed table, the quick view means including i) a custom editor including a list of database tables, each of said database tables including at least one data field that is in another of said database tables, ii) mapping means to map from each of said database tables to another of said database tables using one of the data fields of said each of said database tables, whereby a designer can select which data of said one table can be included as a quick view column in the second viewed table.

2. A system according to claim 1, wherein the visual support means includes visual support to define a simple object which participates in a complex object.

3. A system according to claim 1, wherein the visual support means includes visual support for presentation and manipulation of normalized data.

4. A system according to claim 1, wherein the visual support means includes visual support for computed fields.

5. A system according to claim 4, wherein:

said second of the tables includes a plurality of columns having data; and said computed field includes a value compiled using data from said plurality of columns.

6. A system according to claim 1, wherein the visual support means includes visual support for summary fields.

7. A computing system according to claim 1, wherein:

the visual support means includes means to display first and second linked database tables; and the custom editor includes i) means to enable a user to select a data field of the second of the displayed database tables, and ii) means, acting in response to said selection, to add the selected data field as a column in the first of the displayed database tables.

8. A computing system according to claim 1, wherein:

the visual support means includes means to display first and second linked database tables; and the custom editor includes i) means to enable a user to select a data field of the second of the displayed database tables, and ii) means, acting in response to said selection, to substitute the selected data field for one of the columns in the first of the displayed database tables.

9. A method for performing actions on objects in an object oriented computing system on a computing platform, including a plurality of objects in said object oriented computing system, each object including an object frame containing data attributes and at least one object method for performing actions on the associated object, said objects being arranged in an inheritance hierarchy of objects to define parent and child objects such that child objects inherit the data attributes and methods of parent objects and to further define objects in said inheritance hierarchy which are unrelated as parent and child objects such that unrelated objects do not inherit the data attributes and methods of each other, said object oriented computing system further including an object manager for sending messages to said object to perform actions on the associated object frame using the associated object messages; said action performing method comprising the following steps which are performed by said object oriented computing system in response to a user request;

grouping selected ones of said objects in said inheritance hierarchy which are unrelated to each other as parent and child objects, into a plurality of Complex Objects; and providing visual support to display visually predefined aspects of the attributes and relationships of the objects and complex objects to allow programmatic support for data navigation, presentation and manipulation, including providing a quick view support for selecting columns from one table to be included as columns in a second, viewed table, the quick view support including i) a custom editor including a list of database tables, each of said database tables including at least one data field that is in another of said database tables, ii) mapping means to map from each of said database tables to another of said database tables using one of the data fields of said each of said database tables, whereby a designer can select which data of said one table can be included as a quick view column in the second viewed table.

10. A method according to claim 9, wherein the providing step includes the step of providing visual support to define a simple object which participates in a complex object.

11. A method according to claim 9, wherein the providing step includes the step of providing visual support for presentation and manipulation of normalized data.

12. A method according to claim 9, wherein the providing step includes the step of providing visual support for computed fields.

13. A method according to claim 9, wherein the providing step includes the step of providing visual support for summary fields.

14. A program storage device readable by machine, tangibly embodying a program of instructions executable by the machine to perform method steps for performing actions on objects in an object oriented computing system on a computing platform, including a plurality of objects in said object oriented computing system, each object including an object frame containing data attributes and at least one object method for performing actions on the associated object, said objects being arranged in an inheritance hierarchy of objects to define parent and child objects such that child objects inherit the data attributes and methods of parent objects and to further define objects in said inheritance hierarchy which are unrelated as parent and child objects such that unrelated objects do not inherit the data attributes and methods of each other, said object oriented computing system further including an object manager for sending messages to said object to perform actions on the associated object frame using the associated object messages; said action performing method comprising the following steps which are performed by said object oriented computing system in response to a user request;

grouping selected ones of said objects in said inheritance hierarchy which are unrelated to each other as parent and child objects, into a plurality of Complex Objects; and providing visual support to display visually predefined aspects of the attributes and relationships of the objects and complex objects to allow programmatic support for data navigation, presentation and manipulation, including providing a quick view support for selecting columns from one table to be included as columns in a second, viewed table, the quick view support including i) a custom editor including a list of database tables, each of said database tables including at least one data field that is in another of said database tables, ii) mapping means to map from each of said database tables to another of said database tables using one of the data fields of said each of said database tables, whereby a designer can select which data of said one table can be included as a quick view column in the second viewed table.

15. A program storage device according to claim 14, wherein the providing step includes the step of providing visual support to define a simple object which participates in a complex object.

16. A program storage device according to claim 14, wherein the providing step includes the step of providing visual support for presentation and manipulation of normalized data.

17. A program storage device according to claim 14, wherein the providing step includes the step of providing visual support for computed fields.

18. A program storage device according to claim 14, wherein the providing step includes the step of providing visual support for summary fields.

* * * * *